United States Patent
Loercks et al.

(10) Patent No.: US 6,235,815 B1
(45) Date of Patent: May 22, 2001

(54) BIODEGRADABLE POLYMERIC MIXTURES BASED ON THERMOPLASTIC STARCH

(75) Inventors: Jurgen Loercks, Rees; Winfried Pommeranz, Enger; Harald Schmidt, Emmerich; Ralf Timmermann, Krefeld; Ernst Grigat, Leverkusen; Wolfgang Schulz-Schlitte, Langenfeld, all of (DE)

(73) Assignee: Bio-tec Biologische Naturverpackungen & Co. KG (DE)

( * ) Notice: Subject to any disclaimer, the term of this patent is extended or adjusted under 35 U.S.C. 154(b) by 0 days.

(21) Appl. No.: 09/215,469

(22) Filed: Dec. 18, 1998

Related U.S. Application Data

(63) Continuation of application No. PCT/IB97/00749, filed on Jun. 20, 1997.

(30) Foreign Application Priority Data

Jun. 20, 1996 (DE) .............................. 196 24 641

(51) Int. Cl.[7] ........................................ C08J 1/26
(52) U.S. Cl. .............................................. 524/47
(58) Field of Search ................ 528/176; 524/47

(56) References Cited

U.S. PATENT DOCUMENTS

| | | | |
|---|---|---|---|
| 5,286,770 | * | 2/1994 | Bastioli et al. ............... 524/52 |
| 5,321,064 | * | 6/1994 | Vaidya et al. ............... 524/56 |
| 5,453,144 | * | 9/1995 | Kauffman et al. .......... 156/213 |

* cited by examiner

Primary Examiner—Terressa M. Boykin
(74) Attorney, Agent, or Firm—Workman, Nydegger & Seeley

(57) ABSTRACT

For converting native starch or starch derivatives into thermoplastic starch, added to the starch is at least one hydrophobic biodegradable polymer. This hydrophobic biodegradable polymer, which serves as a plasticizer or swelling agent, may be a polymer selected from the following list: an aliphatic polyester, a copolyester with aliphatic and aromatic blocks, a polyester amide, a polyester urethane, a polyethylene oxide polymer and/or a polyglycol, and/or mixtures of these. When the starch, such as in particular native starch or derivatives thereof, is mixed in the melt with the hydrophobic biodegradable polymer as a plasticizer or swelling agent, to homogenize the mixture, the water content is reduced to <1% by weight based on the weight of the mixture.

31 Claims, No Drawings

BIODEGRADABLE POLYMERIC MIXTURES BASED ON THERMOPLASTIC STARCH

This is a continuation application of PCT/IB97/00749 filed on Jun. 20, 1997.

BACKGROUND OF THE INVENTION

The present invention relates to a biodegradable polymeric material essentially consisting of, or based on, thermoplastic starch, and to a polymer mixture comprising thermoplastic starch, a process for preparing a biodegradable material, a process for preparing a polymer mixture, and also to uses of the biodegradable material and of the polymer mixtures comprising thermoplastic starch.

Biopolymers based on renewable raw materials which are suitable for preparing biodegradable materials (BDM) are largely based on starch and comprise in particular thermoplastic starch, and also polymer mixtures made from thermoplastic starch and from other degradable polymeric components, such as polylactic acid, polyvinyl alcohol, polycaprolactone, tailored copolyesters made from aliphatic diols and from aliphatic or aromatic dicarboxylic acids, and also degradable polyester amides, which, with thermoplastic starch in an anhydrous melt via ester reactions and/or as polymer combinations form new degradable polymeric materials with a high proportion of renewable raw materials. There may be addition of other naturally occurring materials as additives and plasticizers such as glycerol and its derivatives, and hexahydric sugar alcohols such as sorbitol and derivatives of these.

EP 397 819 has for the first time specified a process for preparing TPS and also defined the new starch material known as thermoplastic starch (TPS) and specified the important differences, in particular in plastics processing technology, from the destructured starch which has been known for a relatively long time.

The thermoplastic starch is prepared with the aid of a swelling agent or plasticizer, not only without adding water but more particularly using dry or dried starch and/or starch which has been dried by devolatilization during the extrusion process while in the melt. Starches in the form of native starches commercially available comprise 14% of water, and potato starch as much as 18% of natural moisture at equilibrium.

If a starch with more than 5% of moisture is plasticized or pasted with exposure to temperature and pressure, this always gives a destructured starch. The preparation of the destructured starch is an endothermic procedure.

In contrast, the preparation of the thermoplastic starch is an exothermic procedure. In this case the essentially anhydrous (<5%) native starch is homogenized in an extrusion process with an additive or plasticizer (e.g. glycerol, glycerol acetate, sorbitol) which lowers the melting point of the starch, and is melted within a temperature range of from 120 to 220° C. by introducing mechanical energy and heat. The thermoplastic starch is free from crystalline fractions, or at least the crystalline fractions are less than 5% in the TPS, where the crystalline fractions remain unchanged and very small. The parameters of the process bring about a permanent rearrangement of the molecular structure to give thermoplastic starch, which now comprises practically no crystalline fractions and, contrasting with destructured starch, does not now recrystallize.

In destructured starch, the crystalline fractions immediately after preparation are likewise small, but these increase again when destructured starch is stored. This feature is also apparent in the glass transition temperature, which for thermoplastic starch remains at −40° C., whereas in destructured starch, in contrast, it rises again to above 0° C. For these reasons, destructured starch and materials or blends based on destructured starch gradually become relatively brittle on storage, and, depending on temperature and time elapsed, the stresses contained within the polymer cause creep and distortion of the material (memory effect).

A differentiation of destructured starch and thermoplastic starch is:

| Preparation and properties | Destructured starches | Thermoplastic starches |
| --- | --- | --- |
| Water content | >5 to 50% | <5%, preferably anhydrous in the melt phase |
| Plasticizer Additives | Water, glycerol, sorbitol, mixtures | Glycerol, sorbitol, glycerol acetate, essentially anhydrous |
| Crystalline fractions | >>5% rising on storage | <<5%, no crystalline fractions, unchanged on storage |
| Preparation process | Endothermic | Exothermic |
| Glass transition temperature | >0° C. | <−40° C. |
| Storage properties | Increasing embrittlement | Remains flexible |
| Analytical differentiation | X-ray diffraction of the crystalline fractions | X-ray diffraction of the crystalline fractions |

When polymer mixtures based on thermoplastic starch are prepared, compatibilizers are used to homogenize the hydrophilic and polar starch polymer phase and the hydrophobic and nonpolar other polymer phase, which are either added or preferably are produced in situ (e.g. by transesterification) ecified temperature and shear conditions, to give processable granules. The technology of preparing these thermoplastic blends involves coupling together the phase boundaries between the low-compatibility polymers in such a way as to achieve the distribution structure of the disperse phase during processing via the ideal range of processing conditions (temperature and shear conditions).

The twin-screw extruders which, for example, are used for the compounding are preferably corotating twin-screw extruders with tightly intermeshing screw profile and kneading zones which can be individually temperature-controlled. The twin-screw extruders used for the TPS compounding or preparation of TPS/polymer blends preferably have eight compartments or zones which where appropriate may be extended to ten zones and have, for example, the following construction:

Extruder design: Corotating twin-screw extruder, for example

| | |
| --- | --- |
| Screw length-processing length = | 32–40 L/D |
| Screw diameter D = | 45 mm |
| Screw rotation rate = | 230 rpm |

-continued

| | | |
|---|---|---|
| Throughput = | | 50–65 kg/h |
| Die, diameter = | | 3 mm |
| Die, number = | | 4 |
| Zone 1 | Compressing with devolatilization, gradual melting of the mixture (native and glycerol) | Feed zone temp. 60° C. Pressure - bar |
| Zone 2 | as Zone 1 | Mixing and plasticization Temp. 140° C. Pressure >1 bar Water content 4–7% |
| Zone 3 | as Zone 1 | Plasticization Temp. 180° C. Pressure >1 bar Water content 4–7% |
| Zone 4 | as Zone 1 | Plasticization Temp. 185° C. Pressure >1 bar Water content 4–7% |
| Zone 5 | | Devolatilization, water extraction Temp. 160° C. Pressure vacuum 0.7 bar Water content <1% |
| Zone 6 | (Side feeder, metering-in of the additional polymers, such as PCL) | Metering-in of other polymers Temp. 200° C. Pressure >1 bar Water content <1% |
| Zone 7 | Transition zone, compression zone, reaction zone | Homogenization and where appropriate transesterification Temp. 200° C. Pressure >1 bar Water content <1% |
| Zone 8 | Metering zone, where appropriate evaporation of water of reaction | Homogenization and where appropriate transesterification Temp. 205–210° C. Pressure >1 bar Water content <1% |

Outside the extrusion plant: cooling and conditioning of the extrudates, where appropriate absorption of from 0.3 to 4% of water as plasticizer in a water bath, extrudate granulation, and bagging.

The extrusion conditions given above for preparing thermoplastic starch or mixtures based on thermoplastic starch are substantially directed toward the example of a TPS/PCL (polycaprolactone) polymer mixture. The processing or extrusion conditions change, of course, for polymer mixtures of other types. The example given above is intended merely to show how the prior art prepares polymer mixtures based on thermoplastic starch.

In connection with the original German Patent Application DE 19624641.5, in which the present invention was presented for purposes of a priority application, the relevant search by the German Patent Office mentioned the following publications: Kunststoffe 82 (11), pp. 1086–1089 (1992), WO95/33874, WO94/28029, WO94/03543, EP 580 032, EP 404 727, U.S. Pat. No. 5,453,144, U.S. Pat. No. 5,321,064 and U.S. Pat. No. 5,286,770. All of the publications mentioned, insofar as they refer to starch, relate to native starch or destructured starch, i.e. they have no connection with thermoplastic starch of the type defined at the outset.

In the case of all of the polymer mixtures or polymers described in the prior art and comprising thermoplastic starch or based on thermoplastic starch, the assumption is made that the thermoplastic starch is initially created by conversion from native starch with a very substantially low-molecular-weight plasticizer or swelling agent. In the example given above, the TPS is prepared in Zones 1 to 4. Only subsequently, where appropriate, are other components mixed either purely physically or even to some extent chemically with the thermoplastic starch prepared in this way. In the example given above, an esterification or a transesterification reaction takes place during mixing of the PCL and the TPS, and the homogenization therefore also includes a chemical reaction. The additives and plasticizers which have been proposed and used hitherto, and which lower the melting point of the starch and have adequate solubility parameters, are, as mentioned, low-molecular-weight additives such as, inter alia, DMSO, butanediol, glycerol, ethylene glycol, propylene glycol, a diglyceride, diglycol ether, formamide, DMF, dimethylurea, dimethylacetamide, N-methylacetamide, polyalkene oxide, glycerol mono- or diacetate, sorbitol, sorbitol esters and citric acid.

Use has also been made on occasions of PVOH, EVOH and derivatives of these, and also of urea and urea derivatives.

In the original Patent EP 397 819, the solubility parameter of the plasticizer must be in the required range in order that the function is fulfilled. This is the important factor in the preparation of the thermoplastic starch, that the water removed is substituted by a plasticizer, so that the decomposition temperature of the starch is lowered on conversion to thermoplastic starch or thermoplastically processed starch to a sufficient extent so that the mixing in the melt takes place below the relevant decomposition temperature of the starch.

SUMMARY OF THE INVENTION

Entirely unexpectedly, it has now been found that polymers, such as polyester amides, aliphatic polyesters and copolyesters, and also a large number of other polymers specified below, can take on this function. This now brings with it the important advantage that when, in particular, polymer mixtures are prepared which are based on thermoplastic starch or TPS, the TPS does not firstly have to be prepared by conversion from native starch using a low-molecular-weight plasticizer before the other polymer is metered into it. In contrast, the polymer mixture can be prepared directly in what amounts to a single operation, by mixing native starch or starch derivatives with the additional preferably biodegradable hydrophobic polymer under dry conditions in the melt, where the starch present therein is thermoplastically processable. This therefore dispenses with the requirement for initial admixing of a low-molecular-weight plasticizer, such as glycerol, which the prior art of necessity proposes.

According to the invention therefore a polymeric material is proposed, essentially consisting of, or based on, thermoplastic starch. The thermoplastic starch therefore comprises, as plasticizer or swelling agent very substantially responsible for converting native starch or derivatives thereof into thermoplastic starch, at least one hydrophobic preferably biodegradable polymer.

DESCRIPTION OF THE INVENTION

Hydrophobic biodegradable polymers which have proven suitable are in particular aliphatic polyesters, polyester copolymers with aliphatic and aromatic blocks, polyester amides, polyethylene oxide polymer or polyglycol, and also polyester urethanes and/or mixtures of these.

A great advantage of the use of hydrophobic biodegradable polymers as plasticizers or swelling agents for preparing the thermoplastic starch is that no volatile and/or water-soluble and/or migratable plasticizers are present in the thermoplastic starch as is the case, for example, if low-molecular-weight plasticizers or swelling agents are used for converting native starch or derivatives thereof to the thermoplastic starch. Even in cases where use continues to be made of low-molecular-weight plasticizers or swelling agents, their proportion can be reduced to a level which is so low that the disadvantages mentioned can hardly become apparent.

In particular, copolymeric polyesters and polyester amides show very advantageous improvements in the properties of the starch/polymer materials, particularly those which have a favorable effect on the hydrophobic properties. Intermolecular coupling at the starch-polymer phase and homogeneous distribution of the polymer particles have an effect on the physical properties. The hydrophobic properties, in particular, of the starch plastics are considerably enhanced. Moisture resistance is enhanced and the tendency of the starch plastics to become brittle is markedly lowered. However, aliphatic polyesters and polyester urethanes are also suitable for the conversion of the native starch into thermoplastic starch. At the same time, the polymers mentioned can be used as components for mixing with the thermoplastic starch for preparing biodegradable polymer mixtures.

Possible polymers for mixing with native starch and with starch derivatives or with thermoplastic starch prepared therefrom are in particular the following:

Aliphatic and partially aromatic polyesters made from

A) linear dihydric alcohols, such as ethylene glycol, hexanediol or preferably butanediol, and/or, where appropriate, from cycloaliphatic dihydric alcohols, such as cyclohexanedimethanol, and in addition, where appropriate, from small amounts of higher-functional alcohols, such as 1,2,3-propanetriol or neopentyl glycol, and from linear dibasic acids, such as succinic acid or adipic acid, and/or where appropriate from cycloaliphatic dibasic acids, such as cyclohexanedicarboxylic acid and/or where appropriate from aromatic dibasic acids, such as terephthalic acid or isophthalic acid or naphthalenedicarboxylic acid, and, in addition, where appropriate, from small amounts of higher-functional acids, such as trimellitic acid, or B) building blocks with acid and alcohol functionality, for example hydroxybutyric acid or hydroxyvaleric acid or derivatives of these, for example $\epsilon$-caprolactone, or from a mixture or from a copolymer made from A and B, where the aromatic acids do not make up a proportion of more than 50% by weight, based on all of the acids.

The acids may also be used in the form of derivatives, such as acid chlorides or esters.

Aliphatic polyester urethanes made from

C) an ester fraction made from linear dihydric alcohols, such as ethylene glycol, butanediol, hexanediol, preferably butanediol, and/or where appropriate from cycloaliphatic dihydric alcohols, such as cyclohexanedimethanol, and in addition, where appropriate, from small amounts of higher-functional alcohols, such as 1,2,3-propanetriol or neopentyl glycol, and from linear dibasic acids, such as succinic acid or adipic acid, and/or, where appropriate, from cycloaliphatic and/or aromatic dibasic acids, such as cyclohexanedicarboxylic acid and terephthalic acid and, in addition, where appropriate, small amounts of higher-functional acids, such as trimellitic acid, or D) an ester fraction made from building blocks with acid and alcohol functionality, for example hydroxybutyric acid or hydroxyvaleric acid or derivatives of these, for example $\epsilon$-caprolactone, or from a mixture or from a copolymer made from C) and D), and E) from the reaction product of C) and/or D) with aliphatic and/or cycloaliphatic bifunctional and, in addition where appropriate, with higher-functional isocyanates, e.g. tetramethylene diisocyanate, hexamethylene diisocyanate, isophorone diisocyanate, and, in addition where appropriate, with linear and/or cycloaliphatic dihydric and/or higher-functional alcohols, e.g. ethylene glycol, butanediol, hexanediol, neopentyl glycol and cyclohexanedimethanol, where the ester fraction C) and/or D) is at least 75% by weight, based on the total of C), D) and E).

Aliphatic-aromatic polyester carbonates made from

F) an ester fraction made from linear dihydric alcohols, such as ethylene glycol, butanediol, hexanediol, preferably butanediol, and/or from cycloaliphatic dihydric alcohols, such as cyclohexanedimethanol, and in addition, where appropriate, from small amounts of higher-functional alcohols, such as 1,2,3-propanetriol or neopentyl glycol, and from linear dibasic acids, such as succinic acid or adipic acid, and/or where appropriate from cycloaliphatic dibasic acids, such as cyclohexanedicarboxylic acid, and, in addition, where appropriate, from small amounts of higher-functional acids, such as trimellitic acid, or G) an ester fraction made from building blocks with acid and alcohol functionality, for example hydroxybutyric acid or hydroxyvaleric acid or derivatives of these, for example $\epsilon$-caprolactone, or from a mixture or from a copolymer made from F) and G), and H) from a carbonate fraction which is prepared from aromatic dihydric phenols, preferably bisphenol A, and from carbonate donors, such as phosgene, where the ester fraction F) and/or G) is at least 70% by weight, based on the total of F), G) and H);

Aliphatic polyester amides made from

I) an ester fraction made from linear and/or cycloaliphatic dihydric alcohols, such as ethylene glycol, hexanediol, butanediol, preferably butanediol, cyclohexanedimethanol, and, in addition where appropriate, from small amounts of higher-functional alcohols, such as 1,2,3-propanetriol or neopentyl glycol, and from linear and/or cycloaliphatic dibasic acids, such as succinic acid, adipic acid and cyclohexanedicarboxylic acid, preferably adipic acid, and, in addition where appropriate, from small amounts of higher-functional acids, such as trimellitic acid, or K) an ester fraction made from building blocks with acid and alcohol functionality, for example hydroxybutyric acid or hydroxyvaleric acid or derivatives of these, such as $\epsilon$-caprolactone, or from a mixture or from a copolymer made from I) and K), and L) from an amide fraction made from linear and/or cycloaliphatic dibasic amines, and in addition where appropriate from small amounts of higher-functional amines, for example tetramethylenediamine, hexamethylenediamine, isophoronediamine, and from linear and/or cycloaliphatic dibasic acids, and, in addition where appropriate, from small amounts of higher-functional acids, such as succinic acid or adipic acid, or M) from an amide fraction made from building blocks with acid and amine functionality, preferably ω-laurolactam and particularly preferably ε-caprolactam, or from an amide fraction which is a mixture of L) and M), where the ester fraction I) and/or K) is at least 30% by weight, based on the total of I), K), L) and M).

In connection with polyester amides, reference may be made in particular to EP-A 0 641 817, which relates to the preparation and use of thermoplastically processable and biodegradable aliphatic polyester amides. In this European patent application, monomers from the following classes, in particular, are proposed for synthesis according to the invention of polyester amides: dialcohols, such as ethylene glycol, 1,4-butanediol, 1,3-propanediol, 1,6-hexanediol, diethylene glycol, etc., and/or a dicarboxylic acid, such as oxalic acid, succinic acid, adipic acid, etc., also in the form of their respective esters (methyl, ethyl, etc.) and/or hydroxycarboxylic acids and lactones, such as caprolactone, etc., and/or aminoalcohols, such as ethanolamine, propanolamine, etc., and/or cyclic lactams, such as ε-caprolactam or laurolactam, etc., and/or ω-aminocarboxylic acids, such as aminocaproic acid, etc., and/or mixtures (1:1 salts) of dicarboxylic acids, such as adipic acid, succinic acid, etc. and diamines, such as hexamethylenediamine, diaminobutane, etc.

The ester-forming component may also be hydroxyl- or acid-terminated polyesters with molecular weights from 200 to 10,000.

The conditions for preparation of the polymer mixtures and polymers described above can be dispensed with, since their preparation is very well known from the prior art, for example polyester amides from the above-mentioned EP-0 641 817.

In connection with compostable polyester urethanes, reference may also be made to EP 539 975, and therefore any description of their preparation p with TPS are random copolyesters made from aliphatic and aromatic dicarboxylic acids with a proportion, for example from about 35 to 55 mol %, of aromatic acid, such as terephthalic acid. Polyalkylene terephthalates and polyethylene terephthalates are examples of copolyesters which have proven suitable for mixing with TPS.

The above-mentioned hydrophobic biodegradable polymers can be used on the one hand for converting the native starch or starch derivatives into thermoplastic starch and also for mixing with the thermoplastic starch prepared in this way to produce a biodegradable material based on TPS.

The addition of other additives, such as plasticizers, stabilizers and flame retardants, and also other biodegradable polymers, such as cellulose esters, cellulose acetate, cellulose, polyhydroxybutyric acid, hydrophobic proteins, polyvinyl alcohol, etc., is possible and again depends on the requirements placed on the polymer mixture to be prepared, and also, of course, on the availability of the corresponding components. Other possible additives are the polymers listed below, gelatine, proteins, zeins, polysaccharides, cellulose derivatives, polylactides, polyvinyl alcohol, polyvinyl acetate, polyacrylates, sugar alcohols, shellac, casein, fatty acid derivatives, vegetable fibers, lecithin, chitosan, polyester polyurethanes and polyester amides. Mention should also be made of polyester blends consisting of thermoplastic starch, the aliphatic/aromatic polyester proposed according to the invention, and also, as another component, copolymers selected from the class consisting of ethylene-acrylic acid copolymer and ethylene-vinyl alcohol copolymer.

Suitable fillers include in particular organic fillers obtained from renewable raw materials, such as cellulose fibers. Fibers particularly suitable for reinforcing materials based on TPS or TPS blends are those of vegetable origin, such as cotton, jute, flax, sisal, hemp and ramie fiber.

For the preparation of the thermoplastic starch proposed according to the invention or of biodegradable materials based on thermoplastic starch, it is important that during mixing of the native starch with one of the hydrophobic biodegradable polymers proposed according to the invention, when melting takes place the water content of the native starch is reduced to less than 1% by weight. This is necessary so that when mixing the polymer used as plasticizer or swelling agent the ester groups incorporated into molecular chains of the hydrophobic polymer undergo esterification reactions with the native starch in the absence of water. The molecular chains reacting in this way therefore form, with the starch, a compatibilizer which permits molecular coupling of the two phases, i.e. of the hydrophilic starch phase and the hydrophobic polymer phase, so as to form a continuous phase. If moisture is present, this reaction suffers competition in that in the presence of water the ester groups do not react with the starch to form the compatibilizer but hydrolyze, thus preventing the formation of a compatibilizer and making it impossible for there to be satisfactory dispersion or homogenization. If it is made impossible for the hydrophobic biodegradable polymer used as plasticizer or swelling agent to mix thoroughly with the native starch, the necessary conversion of the native starch in order to prepare the thermoplastic starch cannot take place, and therefore either the starch becomes destructured or else, if the water content is too low, molecular degradation of the starch sets in. An important factor in the conversion of the native starch into thermoplastic starch is of course, as mentioned at the outset, that the melting point of the native starch is reduced during mixing with the plasticizer to such an extent as to prevent molecular decomposition of the starch. On the other hand, however, the melt has to be dried so as to prevent the formation of destructured starch. For this reason, thorough phase mixing of the starch phase with the hydrophobic polymer phase is necessary as described above.

The mixing of native starch or derivatives thereof with the hydrophobic polymer or with hydrophobic block copolymers in the melt with very substantial exclusion of water forms, as mentioned, via the in-situ reaction of the starch with the hydrophobic polymer, the so-called compatibilizer, which may be regarded as an entity in itself or else as a so-called hydrophobic thermoplastic starch. Compared with the thermoplastic starch known from the prior art and prepared using low-molecular-weight plasticizer or swelling agent, such as glycerol or sorbitol, this hydrophobic thermoplastic starch has significantly higher water resistance and the water absorption is, respectively, significantly lower. This hydrophobic thermoplastic starch prepared in this way can serve as a starting point for other tailored polymers by adding other biodegradable hydrophobic polymers.

Besides the native starch preferably used, other suitable raw materials for preparing the thermoplastically reactive starch are starch derivatives, such as starch esters, starch ethers and acid-modified starch. Oxidized starches with an increased content of carboxyl groups are particularly reactive.

Depending on the hydrophobic biodegradable polymer used, the processing temperature or melting point during mixing and during preparation of the thermoplastic starch or of the biodegradable material may be from about 120 to 260° C., preferably from 140 to 210° C. To allow satisfactory conversion of native starch into TPS or hydrophobic TPS, it is necessary to add to the native starch, depending on the hydrophobic polymer used, a proportion of from 10 to 40% by weight, based on the mixture. Besides the proportion of swelling agent or plasticizer, further amounts of the hydrophobic polymer used may also, of course, be added. The range given of from 10 to about 40% by weight relates merely to the amount necessary for the conversion.

It has also been found that it can even be advantageous when mixing the native starch with the hydrophobic biodegradable polymer as plasticizer to reduce the moisture level to markedly below 1% by weight, i.e. to a value below 0.5% by weight, or even below 0.1% by weight, based on the total weight of the mixture. The plasticizer added ensures that the melting point of the starch is reduced in such a way that when the melt is produced in order to prepare the homogeneous mixture, this does not undergo molecular degradation. It would still be possible, of course, when preparing the thermoplastic starch or the biodegradable polymeric material, also to add glycerol, sorbitol or another plasticizer, but this might in some cases have an effect on the physical and/or mechanical properties of the material to be prepared. These properties can generally be improved if the addition of relatively large amounts of low-molecular-weight plasticizers can be dispensed with.

Examples of possible and preferred polymer mixtures and of biodegradable materials, at least comprising starch or thermoplastic starch and a hydrophobic biodegradable polymer, are listed in Tables 1 to 4 below. These examples are supplemented by a key in which all of the abbreviations, and also any materials used in the examples, are described and explained.

These examples, 22 in total, include on the one hand components which have been used in the sense of plasticizer or swelling agent for preparing the thermoplastic starch or hydrophobic thermoplastic starch and on the other hand additional polymeric partners for mixing with the thermoplastic starch for preparing biodegradable polymer mixtures proposed according to the invention. These partners for mixing are likewise hydrophobic biodegradable polymers. In addition, the tables comprise the processing conditions and in particular the water content prevailing in the extruder during the preparation of the polymer mixture. This is in all cases <0.1% by weight. The tables also give preferred possible applications for the examples of biodegradable polymeric materials prepared. Of course, the tables comprise only examples, and all of the components mentioned at the outset are suitable for mixing with starch or with thermoplastic starch to prepare industrially-applicable or non-industrially-applicable polymer mixtures or biodegradable materials as defined in the invention.

TABLE 1

| Example | 1 | 2 | 3 | 4 | 5 | 6 | 7 |
|---|---|---|---|---|---|---|---|
| [1]Starch % | 28.7 | 28.7 | 28.7 | 28.7 | 33.3 | 33.3 | 33.3 |
| [1a]TIR 2900 % | 16.3 | 16.3 | 16.3 | 16.7 | — | — | — |
| [1b]TIR 2901 % | — | — | — | — | 18.9 | — | — |
| [1c]TIR 2905 % | — | — | — | — | — | 18.9 | — |
| [1d]TIR 2906 A % | — | — | — | — | — | — | 18.9 |
| [2]TPS % | 45 | 45 | 45.0 | 45.0 | 52.2 | 52.2 | 52.2 |
| $H_2O$ % | <0.1 | <0.1 | <0.1 | <0.1 | <0.1 | <0.1 | <0.1 |
| [3]PLA % | — | — | — | 55 | — | — | — |
| [4]Polyamide 1 | — | 55 | — | — | — | — | — |
| [5]Polyester 1 | — | — | 55 | — | — | — | — |
| [6]PCL % | 55 | — | — | — | 47.8 | 47.8 | 47.8 |
| [7]Extrusion | ZSK 40 | ZSK 40 | ZSK 40 | ZSK 40 | ZSK 40 | ZSK 40 | ZSK 40 |
| T° C. | 150 | 170 | 200 | 195 | 155 | 210 | 210 |
| Pressure bar | 6.1 | 8.5 | 11 | 6.5 | 5 | 7.5 | 7 |

TABLE 1-continued

| Example | 1 | 2 | 3 | 4 | 5 | 6 | 7 |
|---|---|---|---|---|---|---|---|
| MFR g/10' | 10 | 13 | 9.5 | 8.5 | 11 | 9.7 | 9.5 |
| Granules | 4 mm | 4 mm | 4 mm | 4 mm | 4 mm | 4 mm | 4 mm |
| Granule $H_2O$ % | 0.3 | 0.2 | 0.4 | 0.1 | 0.2 | 0.2 | 0.3 |
| Application | | | | | | | |
| Blown film | + | + | + | + | + | + | + |
| Flat film | + | + | + | + | + | + | + |
| Sheets | + | + | + | + | + | + | + |
| Injection molding | + | + | − | + | + | − | − |
| Fibers | − | − | − | − | − | − | − |

TABLE 2

| Example | 8 | 9 | 10 | 11 | 12 | 13 | 14 |
|---|---|---|---|---|---|---|---|
| [1]Starch % | 33.3 | 33.3 | 52.5 | 33.3 | 33.3 | 33.3 | 33.3 |
| [1a]TIR 2900 % | — | — | 23.5 | 18.9 | 18.7 | 18.7 | 18.7 |
| [1f]TIR 2908 | — | 18.9 | — | — | — | — | — |
| [2]TPS % | 52.2 | 52.2 | 76.0 | 52.2 | 52.2 | 52.2 | 52.2 |
| [3]PLA % | — | — | — | — | — | 47.8 | — |
| [4]Polyamide 1 | — | — | — | 47.8 | — | — | — |
| [5]Polyester 1 | — | — | — | — | 47.8 | — | 20.0 |
| [6]PCL % | 47.8 | 47.8 | 24.0 | — | — | — | 27.8 |
| $H_2O$ % | <0.1 | <0.1 | <0.1 | <0.1 | <0.1 | <0.1 | <0.1 |
| [7]Extrusion | ZSK 40 | ZSK 40 | ZSK 40 | ZSK 40 | ZSK 40 | ZSK 40 | ZSK 40 |
| T° C. | 170 | 170 | 150 | 165 | 210 | 210 | 205 |
| Pressure bar | 5.5 | 3.5 | 8.5 | 4.0 | 6.5 | 8.0 | 8.5 |
| MFR g/10' | 9.5 | 25 | 9.5 | 11.5 | 9.5 | 8.5 | 8.0 |
| Granules | 4 mm | 4 mm | 4 mm | 4 mm | 4 mm | 4 mm | 4 mm |
| Granules $H_2O$ % | 0.3 | 0.2 | 0.2 | 0.1 | 0.2 | 0.2 | 0.3 |
| Application | | | | | | | |
| Blown film | + | + | + | + | + | + | + |
| Flat film | + | − | + | + | + | + | + |
| Sheets | + | − | + | + | + | + | + |
| Injection molding | − | − | − | + | − | − | − |
| Fibers | − | + | − | − | − | − | − |

TABLE 3

| Example | 15 | 16 | 17 | 18 | 19 | 20 | 21 |
|---|---|---|---|---|---|---|---|
| [1]Starch % | 20.0 | 20.0 | 47.3 | 33.3 | 47.3 | 33.3 | 51.0 |
| [1a]TIR 2900 % | 11.4 | 11.4 | 21.1 | 18.9 | 21.1 | 18.7 | 21.2 |
| [2]TPS % | 31.4 | 31.4 | 68.4 | 52.2 | 68.4 | 52.2 | 71.2 |
| $H_2O$ % | <0.1 | <0.1 | <0.1 | <0.1 | <0.1 | <0.1 | <0.1 |
| PLA | — | — | — | — | 32.6 | — | — |
| [10]CAc % | 68.6 | 63.6 | 32.6 | 21.0 | — | 21.0 | — |
| [4]Polyamide 1 | — | — | — | 26.8 | — | — | — |
| [5]Polyester 1 | — | — | — | — | — | 26.8 | 10.0 |
| [6]PCL % | — | 5.0 | — | — | — | — | 14.8 |
| [7]Extrusion | ZSK 40 | ZSK 40 | ZSK 40 | ZSK 40 | ZSK 40 | ZSK 40 | ZSK 40 |
| T° C. | 210 | 210 | 195 | 195 | 185 | 195 | 205 |
| Pressure bar | 9 | 8 | 6.5 | 6 | 7 | 6.5 | 8.5 |
| MFR g/10' | 8.5 | 9.5 | 9.5 | 10 | 8.5 | 9 | 8.0 |
| Granules | 4 mm | 4 mm | 4 mm | 4 mm | 4 mm | 4 mm | 4 mm |
| Granules $H_2O$ % | 0.1 | 0.2 | 0.2 | 0.1 | 0.2 | 0.2 | 0.3 |
| Application | | | | | | | |
| Blown film | − | − | − | − | − | − | + |
| Flat film | + | + | + | + | + | + | − |
| Sheets | + | + | + | + | + | + | + |
| Injection molding | + | + | + | + | + | + | − |
| Fibers | − | − | − | − | − | − | − |

TABLE 4

| Example | 22 |
|---|---|
| [1]Starch % | 2.0 |
| [1a]TIR 2900 % | 1.4 |
| [2]TPS % | 3.4 |
| [3]PLA | — |
| [10]CAc % | — |
| [4]Polyamide 1 | — |
| [5]Polyester 1 | 59.0 |
| [6]PCL % | 35.6 |
| H$_2$O % | <0.1 |
| [7]Extrusion | ZSK 40 |
| T° C. | 170 |
| Pressure bar | 6 |
| MFR g/10' | 10 |
| Granules | 4 mm |
| Gra H$_2$O % | 0.1 |
| Application | |
| Blown film | + |
| Flat film | + |
| Sheets | − |
| Injection molding | − |
| Fibers | − |

Key:
[1]Starch = native potato starch, dried, 3.5% H$_2$O: plasticizer 1a–1f Bayer polymers as listed below.
[2]TPS = thermoplastic starch = starch + plasticizer <0.1% H$^2$O, − water proportion by devolatilization, based on EP 0 397 819
[3]PLA (polylactic acid resin) = Mitsui Toatsu Chemicals LACEA H 100 MFR 13 190° C. 2.16 kg
[4]Polyamide 1 = Bayer BAK 1095 polyester amide MFR 2.5 150° C. 2.16 kg
[5]Polyester 1 = BASF ZK 242/108 copolyester made from aliphatic diols and aliphatic/aromatic dicarboxylic acids MFR 3.0 at 190° C./2.16 kg
[6]PCL (polycaprolactone) = Union Carbide Tone Polymer P-787 MFR 1.0 1.25° C. 44 psi g/10 min
[7]Extrusion equipment = Werner & Pfleiderer ZSK 40 MFR 150° C., 10 kg
[10] CAc cellulose diacetate DS 2.5

The materials termed TIR 2900–TIR 2908 are polyester amide products from Bayer, with the following properties:

TIR 2900 is a polyester amide with an ester proportion of 48.5% by weight made from adipic acid and 1,4-butanediol, and an amide proportion of 41.2% by weight made from polycaprolactam, and also 10.3% by weight of stearic acid, based on the total mix. The product has a relative solution viscosity of 1.29, measured at 0.5% strength in m-cresol.

TIR 2901 is a polyester amide with an ester proportion of 29.8% by weight made from adipic acid and 1,4-butanediol, and an amide proportion of 56.1% by weight made from polycaprolactam, and also 14.1% by weight of stearic acid, based on the total mix. The product has a relative solution viscosity of 1.25, measured at 0.5% strength in m-cresol.

TIR 2905 is an ester made from 58.2% by weight of citric acid and 41.8% by weight of glycerol, with an average molecular weight of about 600 g/mol.

TIR 2906-A is an ester made from 48.6% by weight of glycerol and 51.4% by weight of adipic acid, with an average molecular weight of about 500 g/mol.

TIR 2907-A is a polyester amide with an ester proportion of 32.3% by weight, made from adipic acid and glycerol and an amide proportion of 54.1% by weight, made from polycaprolactam, and also 13.6% by weight of stearic acid, based on the total mix. The product has a relative solution viscosity of 2.00, measured at 0.5% strength in m-cresol.

TIR 2908 is a polyester amide with an ester proportion of 42.0% by weight made from adipic acid and 1,4-butanediol, and an amine proportion of 58.0% by weight made from polycaprolactam, based on the total mix. The product was dissolved at 15% strength in caprolactam at 90° C. and then cast onto a plate, cooled with dry ice and comminuted. The material was heated to reflux four times at about 20% strength in acetone. The solution was poured into a vat, with vigorous stirring, and diluted with again about the same amount of acetone, and the precipitate was filtered off with suction and dried in a vacuum drying cabinet at from 30 to 40° C. The product has a relative solution viscosity of 2.12, measured at 0.5% strength in m-cresol.

Injection moldings, extrudates and films produced using polymer mixtures proposed according to the invention have, besides relatively good material properties, excellent biodegradability and therefore are capable of making a substantial contribution to the acute problem of waste. For example, films produced from a polymer mixture proposed according to the invention have excellent suitability for a wide variety of applications in the agricultural sector, for example for covering fields, but films of this type after their use can either be composted or ploughed into the earth in the field. Polymer mixtures of this type are also suitable for producing composting sacks, containers for waste for composting, etc. In addition, it is possible to produce, for example, containers and bottles from the polymer mixture proposed according to the invention, using blow molding.

The rate of degradation can be influenced by the selection of the polymer components.

The novel polymer mixtures are, however, also suitable for producing textile products, for example for producing fibers, monofilaments, sheet materials, such as wovens, felts, nonwovens, backsheets, composite textile materials, flocks and waddings, and also linear products, such as fibers, yarns, ropes, cords, etc. In particular, it has been shown in practice that the novel polymer mixtures are suitable for producing hygiene items, such as diapers, bandaging and sanitary napkins, incontinence products, and also bed inserts. The structure of these hygiene items has, inter alia, nonwovens produced from the novel polymeric material, since this has very good skin compatibility, is breathable and permeable to water vapor, and at the same time waterproof, but together with this is completely biodegradable.

The novel fibers are also suitable for producing filter materials, such as in particular cigarette filters.

Many of the polymer mixtures proposed according to the invention, such as in particular comprising thermoplastic starch and, respectively, a copolyester and/or a polyester amide and/or a polyester urethane, are also suitable as an adhesive, or else can be used as coatings, for example for impregnating textile webs. It has been found here that the polymer mixtures proposed according to the invention and suitable for these application sectors are preferably at least to some extent prepared and applied as solutions in alcoholic solvents. For example, it was surprisingly found, in the context of some experiments carried out as examples, that the polymer mixtures prepared in this way are soluble in a hot alcohol-ethanol mixture. In this case, too, a possible use became apparent in the sense of a biodegradable adhesive, as a coating or impregnation, which gives hydrophobic properties and is permeable to water vapor.

Solvents which have proven suitable, besides alcohols, are ketones, ethers, halogenated or halogen-free hydrocarbons and esters. Preference is given to the use of acetone, ethyl acetate, isopropanol, methanol, dichloromethane, chloroform, tetrahydrofuran, ethanol or toluene. According to the invention, the concentrations of the solutions are from 70 to 1% by weight proportion of polymer, preferably from 50 to 8% by weight proportion of polymer, particularly preferably from 40 to 19% by weight proportion of polymer.

Using this method it is therefore possible to prepare solutions of compostable adhesives which can be used for adhesive bonding, for example using suitable adhesive bonding equipment and preferably at temperatures in the order of from 60 to 100° C. By applying, for example, reduced pressure to accelerate removal of the solvent, or by adding crystallization accelerators, the bonding procedure can be accelerated. The novel adhesives can be used for adhesive bonding of, for example, leather, ceramics, wood, board, paper or plastics.

A still further application of the thermoplastic starch specified according to the invention or of the polymer mixtures based on thermoplastic starch is the production of flexible packaging consisting of paper and of a film made from the novel material, by laminating the paper with the film via high-temperature calendering. This composite made from paper and bioplastic film can readily be printed and is biodegradable and suitable for producing flexible packaging for food and non-food sectors.

High-quality wall coverings, so-called vinyl wallcoverings, are produced by coating with a PVC plastisol in a screen-printing or gravure-printing process. The emission problems and environmental problems of products which comprise PVC have been known for a long time. The novel polymer mixtures can be used to produce blown films or flat films in a thickness, usual for the coating of wallcoverings, of from 80 to 120 µm, and this coating may, where appropriate, comprise fillers and other additives, and be adhesively bonded with the wallcovering paper by hot-sealing in a calender device, and then printed a number of times, as is known.

The significantly improved material properties of the novel polymer mixtures, in particular in relation to high dimensional stability, even under variable climatic conditions, give rise to applications which have hitherto been unavailable to other high-quality materials. A particular reason for this is that these novel materials which have been newly developed are biodegradable, if the surroundings and the environmental conditions meet certain requirements. Another application is therefore the production of equipment for military maneuvers and military exercises in the defense sector. These have hitherto been produced from plastics which cause the expected pollution of the environment after their use, since, as is known, it is impossible to retrieve them, or to retrieve them adequately. It is therefore advantageous if this equipment for military maneuvers and military exercises can be made from the novel biodegradable materials.

Again in the defense sector, so-called traverse aids and folding roadways are known, and are widely used in civil sectors, as well as in military sectors, in order to render impassable areas traversable. Folding roadways are usually produced from metallic materials and seldom from plastic. In theory, folding roadways should be retrieved after the exercise or after their use, but in practice this is not done since the folding roadways have been distorted as a result of heavy traffic loading, in particular by heavy freight vehicles and armored vehicles, and therefore have no further use. In order that environmental pollution is reduced, even in cases such as these, it is advantageous to use folding roadways made from the high-strength bio-degradable materials proposed.

The polymer solutions proposed according to the invention may also be used for the waterproofing of non-waterproof, compostable articles, by coating these articles at temperatures above 60° C., preferably above 70° C. The non-waterproof compostable articles may be: cellulose products, such as paper or board, textile structures, such as fabrics or nonwovens, wood or timber materials, starch-containing materials, such as starch foam with or without biodegradable polymers as a partner in the blend, films or moldings made from biodegradable materials, leather or leather materials, chitin and/or products made therefrom. The novel coatings are also suitable for paper coating. The novel coatings can also be used for inhibiting the corrosion of metals. It is also possible to provide disposable culinary implements, storage containers or coffins with waterproof coatings. The layer thickness of the coating is generally from 0.1 to 20 mm, preferably from 0.5 to 10 mm, in particular from 1 to 5 mm.

However, the novel polymeric materials based on thermoplastically processable starch are, of course, also suitable for any number of other applications, including, for example, disposable injection-molded products, etc.

What is claimed is:

1. A polymeric mixture consisting essentially of thermoplastic starch containing, as a plasticizer responsible for converting at least one of native starch or a starch derivative into the thermoplastic starch, at least one hydrophobic biodegradable polymer selected from the group consisting of aliphatic polyesters, copolyesters having aliphatic and aromatic blocks, polyester amides, polyethylene oxide polymers, polyglycols, and mixtures thereof, wherein the thermoplastic starch is formed by heating and mixing the native starch or starch derivative with the biodegradable polymer in a manner so as to yield a thermoplastic starch melt having a water content of less than 5% by weight based on the total weight of the polymeric mixture and prior to cooling the melt.

2. A polymeric mixture as defined in claim 1, wherein the thermoplastic starch is formed by in situ reaction of the native starch or starch derivative with the hydrophobic polymer by heating and mixing in a manner so that the thermoplastic starch melt has a water content of less than 1% by weight of the polymeric mixture prior to cooling, and in the optional presence of an additional plasticizer comprising a low-molecular-weight plasticizer.

3. A polymeric mixture as defined in claim 1, wherein the hydrophobic biodegradable polymer is included in an amount in a range from about 10% to about 40% by weight of the polymeric mixture.

4. A polymeric mixture as defined in claim 1, further including at least one additional hydrophobic biodegradable polymer.

5. A polymeric mixture as defined in claim 4, wherein the additional hydrophobic biodegradable polymer is selected from the group consisting of aliphatic polyesters, copolyesters having aliphatic and aromatic blocks, polyester amides, polyester urethanes, polyethylene oxide polymers, polyglycols, and mixtures thereof.

6. A polymeric mixture as defined in claim 4, wherein the at least one hydrophobic biodegradable polymer or the at least one additional hydrophobic biodegradable polymer includes at least one polymer selected from the group consisting of:

1) aliphatic and partially aromatic polyesters of
   A) linear or cycloaliphatic dihydric alcohols and linear dibasic or cycloaliphatic dibasic acids, or
   B) building blocks with acid and alcohol functionalities, or copolymers of A and B, wherein the aromatic acid content does exceed 50% by weight based on all of the acids;

2) aliphatic polyester urethanes of
   C) esters of linear of cycloaliphatic dihydric alcohols and linear or cycloaliphatic or aromatic dibasic acids, or
   D) esters from building blocks with acid and alcohol functionalities, or copolymers of C) and D), and E) reaction products of C) and D) or both with at least one aliphatic or cycloaliphatic bifunctional isocyanate, wherein the ester of C) and D) is at least 75% by weight, based on the total of C), D) and E);

3) aliphatic-aromatic polyester carbonates of
F) esters of linear of cycloaliphatic dihydric alcohols, and linear or cycloaliphatic dibasic acids, or
G) esters of building blocks with acid and alcohol functionalities, or copolymers of both F) and G), or
H) carbonates from an aromatic dihydric phenol or a carbonate donor, wherein the ester fraction F) and G) is at least 70% by weight, based on the total of F), G) and H);

4) aliphatic polyester amides of
I) esters of linear of cycloaliphatic dihydric alcohols and linear or cycloaliphatic dibasic acids or,
K) esters of building blocks with acid and alcohol functionalities, or copolymers of I) and K), and
L) amides of linear of cycloaliphatic dibasic amines, and linear or cycloaliphatic dibasic acids, or
M) amides of building blocks with acid and amine functionalities, or mixtures of L) and M), where the ester fraction I) and K) is at least 30% by weight based on the total of I), K), L) and M).

7. A polymeric mixture as defined in claim 4, wherein the plasticizer and the additional hydrophobic biodegradable polymer includes a polyester copolymer of at least one diol selected from the group consisting of 1,2-ethanediol, 1,3-propanediol, 1,4-butanediol and 1,6-hexanediol, and at least one aromatic dicarboxylic acid, and optionally at least one aliphatic dicarboxylic acid.

8. A polymeric mixture as defined in claim 1, wherein the plasticizer includes a copolyester comprising at least one aromatic dicarboxylic acid and at least one aliphatic dicarboxylic acid.

9. A polymeric mixture as defined in claim 4, wherein at least one of the plasticizer or the additional hydrophobic biodegradable polymer is selected from the group consisting of polylactic acid, polyhydroxybutyric acid, polyhydroxybenzoic acid, polyhydroxybutyric acid-hydroxyvaleric acid copolymer, and polycaprolactone.

10. A polymeric mixture as defined in claim 4, wherein at least one of the plasticizer or the additional hydrophobic biodegradable polymer is at least one oligomeric polyester amide with a molecular weight of at least 300 of at least one monomer selected from the group consisting of dialcohols, dicarboxylic acids and their respective esters, hydroxycarboxylic acids and lactones, amino alcohols, cyclic lactams, ω-aminocarboxylic acids, and mixture of dicarboxylic acids and diamines.

11. A layered film comprising one or more layers of the polymeric mixture defined in claim 1.

12. A container comprising a blow molded composition of the polymeric mixture defined in claim 1.

13. An adhesive or coating composition consisting essentially of an alcoholic solution of the polymeric mixture defined in claim 1.

14. A method for manufacturing a polymeric mixture consisting essentially of thermoplastic starch, wherein at least one of native starch or a starch derivative is homogenized while in the form of a thermoplastic starch melt by means of a plasticizer and in a manner so that the water content prior to or during heating and mixing of the thermoplastic starch melt is reduced to less than 5% by weight based on the weight of the polymeric mixture prior to cooling of the melt, wherein the plasticizer is at least one hydrophobic biodegradable polymer selected from the group consisting of aliphatic polyesters, copolyesters having aliphatic and aromatic blocks, polyester amides, polyester urethanes, polyethylene oxide polymers, polyglycols, and mixture thereof.

15. A method for manufacturing a polymeric mixture as defined in claim 14, wherein the native starch or starch derivative is mixed in the thermoplastic starch melt with at least one hydrophobic biodegradable polymer which reacts in situ with the native starch or starch derivative, thereby forming a reaction product thereof which serves as a compatibilizer for facilitating formation of a homogenous polymer melt.

16. A method for manufacturing a polymeric mixture as defined in claim 14, wherein the water content of the thermoplastic starch melt prior to or during mixing is reduced to less than about 0.1% by weight of the polymeric mixture prior to cooling.

17. A method for manufacturing a polymeric mixture as defined in claim 14, wherein the thermoplastic starch melt is formed within a temperature range of about 120° C. to about 260° C.

18. A method for manufacturing a polymeric mixture as defined in claim 14, wherein the thermoplastic starch melt is formed in at least one of an extruder or kneader and wherein the thermoplastic starch melt is drawn off from a die thereof and cooled in a water bath and conditioned.

19. A method for manufacturing a polymeric mixture as defined in claim 18, wherein the polymeric mixture is in the form of a granulate having a maximum water content of about 1% by weight of the granulate prior to conditioning.

20. A method for manufacturing a blown film which comprises conditioning granulates of the polymeric mixture defined in claim 1 with a plasticizer and then conducting a blow-extrusion process.

21. A method for manufacturing a blown film as defined in claim 20, wherein the granulates are conditioned to a water content in a range from about 1% to about 6% by weight of the granulates and then blown-extruded to yield a film.

22. A method for manufacturing a film having one of more layers of the polymer mixture defined in claim 1, wherein plasticization of the thermoplastic starch and subsequent production of the film takes place continuously and in a single process.

23. A polymeric mixture as defined in claim 8, wherein the aromatic dicarboxylic acid includes terephthalic acid and the aliphatic dicarboxylic acid includes at least one of adipic acid or sebacic acid.

24. A polymeric mixture as defined in claim 1, wherein the polymeric mixture has a water content of less than about 0.5% by weight of the polymeric mixture while in a melted state and prior to cooling.

25. A polymeric mixture as defined in claim 1, wherein the polymeric mixture has a water content of less than about 0.1% by weight of the polymeric mixture while in a melted state and prior to cooling.

26. A polymeric mixture as defined in claim 1, wherein the polymeric mixture has been conditioned, upon cooling of the thermoplastic starch melt, to a water content in a range from about 1% to about 6% by weight of the polymer mixture.

27. A polymeric mixture as defined in claim 1, wherein the polymeric mixture has been conditioned, upon cooling of the thermoplastic starch melt, to a water content in a range from about 0.3% to about 4% by weight of the polymer mixture.

28. A method for manufacturing a polymeric mixture as defined in claim 14, wherein the water content of the thermoplastic starch melt prior to or during mixing is reduced to less than about 1% by weight of the polymeric mixture prior to cooling.

29. A method for manufacturing a polymeric mixture as defined in claim 14, wherein the water content of the thermoplastic starch melt prior to or during mixing is reduced to less than about 0.5% by weight of the polymeric mixture prior to cooling.

30. A method for manufacturing a polymeric mixture as defined in claim 14, further including cooling the thermoplastic starch melt and conditioning the polymeric mixture to a water content in range from about 1% to about 6% by weight of the polymeric mixture.

31. A method for manufacturing a polymeric mixture as defined in claim 14, further including cooling the thermoplastic starch melt and conditioning the polymeric mixture to a water content in range from about 0.3% to about 4% by weight of the polymeric mixture.

\* \* \* \* \*

UNITED STATES PATENT AND TRADEMARK OFFICE
CERTIFICATE OF CORRECTION

PATENT NO. : 6,235,815 B1
DATED : May 22, 2001
INVENTOR(S) : Jurgen Lorcks, Winfried Pommeranz, Harald Schmidt, Ralf Timmermann, Ernst Grigat and Wolfgang Schulz-Schlitte Page 1 of 1

It is certified that error appears in the above-identified patent and that said Letters Patent is hereby corrected as shown below:

Column 1,
Line 63, change "contrasting with" to -- in contrast to --

Column 2,
Line 61, after "example" insert -- : --

Column 4,
Line 37, before "important" change "the" to -- an --

Column 8,
Line 12, after "agent" insert -- , --

Column 9,
Line 32, after "include" insert -- , --; and after "hand" insert -- , --
Line 35, after "and" insert -- , --; and after "hand" insert -- , --

Column 12,
Lines 14 and 43, after "example" insert -- , --

Column 14,
Line 21, after "amides," insert -- polyester urethanes, --

Signed and Sealed this

Thirtieth Day of April, 2002

Attest:

*Attesting Officer*

JAMES E. ROGAN
*Director of the United States Patent and Trademark Office*